——— PRINCIPAL STEPS
— — — ALTERNATE STEPS 3,779,957
MICROCAPSULAR OPACIFIER SYSTEM
Anthony E. Vassiliades, Deerfield, Edward F. Nauman, Lake Forest, and Shrenik Shroff, Chicago, Ill., assignors to Champion International Corporation, New York, N.Y.
Application Apr. 29, 1969, Ser. No. 820,267, now Patent No. 3,669,899, which is a continuation-in-part of application Ser. No. 786,337, Dec. 23, 1968, now Patent No. 3,585,149. Divided and this application Apr. 20, 1972, Ser. No. 246,083
Int. Cl. B44d 1/02; B01j 13/02; C09d 5/00
U.S. Cl. 260—2.5 B
32 Claims

ABSTRACT OF THE DISCLOSURE

Opacifiers comprising air-containing microcapsules having an average particle diameter of predetermined size with pigment particles incorporated in the microcapsular structure provide highly opaque surfaces when coated onto and/or incorporated into fibrous and non-fibrous substrates. The opacifiers are produced by heating liquid-containing precursor microcapsules, which contain the pigment particles in their structure, at temperatures sufficient to expel the liquid and provide air in the microcapsules.

CROSS-REFERENCE TO RELATED APPLICATION

Figure 1:
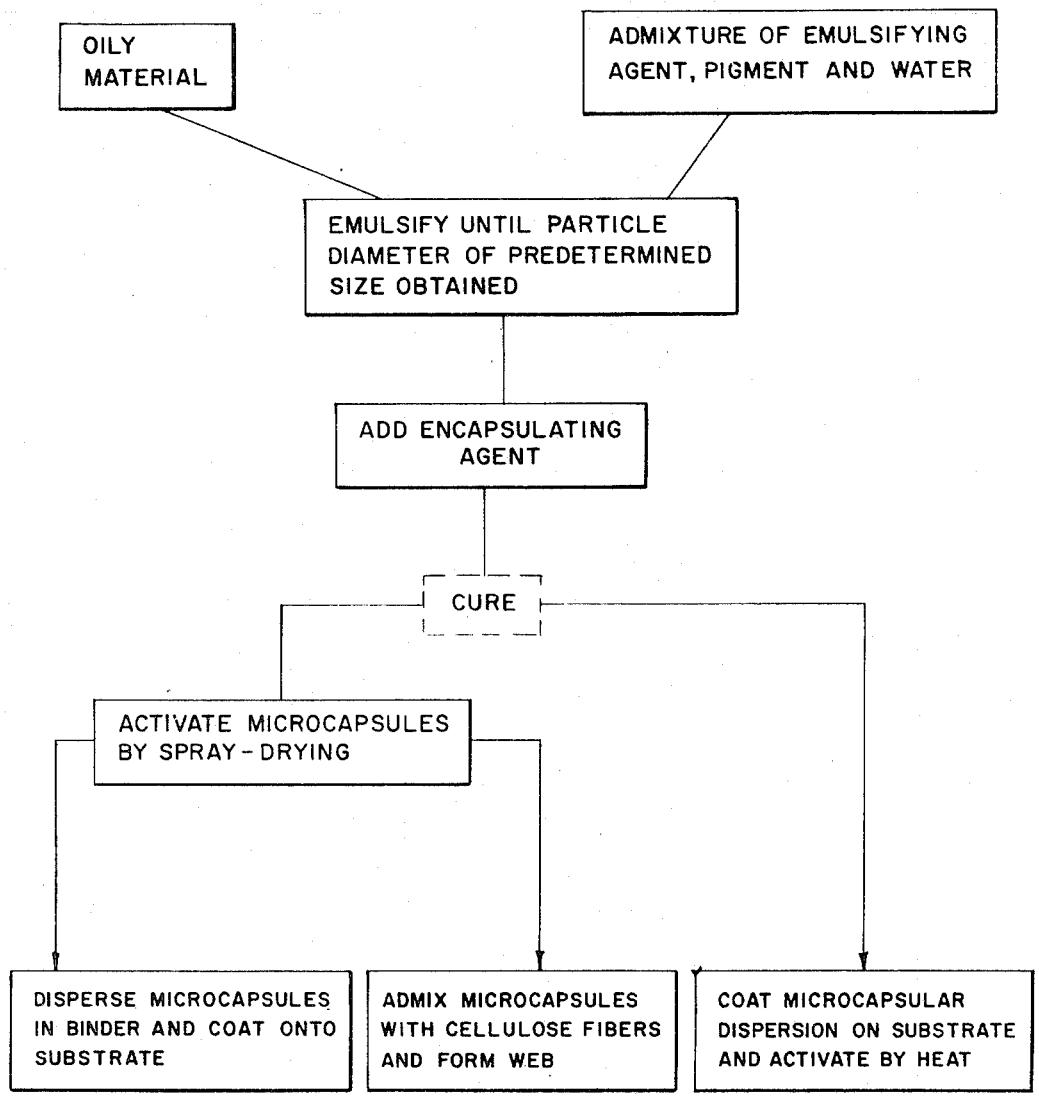

This application is a division of application Ser. No. 820,267 filed Apr. 29, 1969, now U.S. Patent No. 3,669,899, which, in turn, is a continuation-in-part of U.S. patent application Ser. No. 786,337, filed Dec. 23, 1968, now U.S. Patent No. 3,585,149.

FIELD OF THE INVENTION

This invention relates to a method for providing high opacity in fibrous and non-fibrous substrates, surface finishes and to the substrates produced by such method. More specifically, this invention relates to microcapsular opacifiers, their production, and the use of such opacifiers in coatings, substrates and the like.

DESCRIPTION OF THE PRIOR ART

The development of fibrous and non-fibrous systems having a high opacity has always been a great concern to paper manufacturers and paint manufacturers.

The degree of opacity of a particular substrate is the result of diffuse light-scattering which occurs when visible radiation is reflected from particles on the surface of the substrate and in the substrate medium itself. It has been conventional to employ coatings of high density inorganic fillers, such as titanium dioxide, calcium carbonate and certain clays, to enhance the opacity of various substrates. However, the employment of such fillers has many disadvantages in the production of paper, for example.

Generally, the use of such inorganic opacifying materials greatly increases the weight of the paper. This increase in weight is not consistent with the increasing market demands for producing a light-weight paper having high opacity.

Also, the incorporation of large amounts of fillers in paper results in a substantial loss of the paper web strength. In addition, the generally low retention of the inorganic opacifiers in the paper results in a substantial monetary loss by virtue of the high by-product waste material thereby resulting. More importantly, this results in heavy contamination of streams and other waterways. In addition to the foregoing disadvantages in the employment of such inorganic filler materials in paper, most inorganic fillers possess a low opacity-to-weight ratio when incorporated in paper and other thin substrates.

For about the last ten years, microcapsules containing both liquid and solid nucleus materials have found acceptance in a variety of commercial applications. For example, one of the most widespread uses of microcapsules has been in the art of transfer-copy systems. Other recent applications in which the microcapsules have been used extensively are in adhesives and adhesive tapes, fertilizers, pharmaceuticals, foods and cosmetics.

In co-pending application Ser. No. 786,337 filed Dec. 23, 1968, in the name of A. E. Vassiliades, E. F. Nauman and S. Schroff, now U.S. Patent No. 3,585,149 microcapsular opacifiers containing an encapsulated medium or core material which consists essentially of air are described. It was found that when such air-containing microcapsules were coated onto and/or incorporated into a substrate, such as paper, glass, film, metal, wood, etc., or incorporated into surface finishes such as paints, they significantly increased the opacity of the substrate by scattering back substantial amounts of the incident light which would otherwise be transmitted by the substrate. Furthermore, it was discovered that when such air-containing microcapsules were incorporated into and onto various substrates, high opacities result which were heretofore unobtainable with similar amounts of inorganic opacifiers. Since the air-containing microcapsules were relatively light in weight, the incorporation of such microcapsules into a fibrous cellulosic substrate, for example, induced a high opacity for the substrate, without greatly increasing the weight of the substrate.

It is an object of this invention to provide a means for increasing the opacity of fibrous and non-fibrous substrates, without significantly increasing the weight of said substrates, to an extent not heretofore possible.

It is another object of this invention to substantially improve the optical properties, e.g., opacity and brightness, of fibrous substrates without decreasing the web strength of such substrate.

Another object of the present invention is to provide fibrous and non-fibrous substrates having an increased brightness without a substantial attendant increase in weight.

Still another object of the present invention is to provide opacifiers which possess a high opacity-to-weight ratio when incorporated into coatings, on fibrous and in non-fibrous substrates.

Another object of the present invention is to provide a method for the production of the light weight opacifiers possessing a high opacity-to-weight ratio.

SUMMARY OF THE INVENTION

The foregoing and other objects and features of the present invention are achieved by providing microcapsules containing air and finely divided inorganic pigment particles which microcapsules have a predetermined average particle diameter. Surprisingly, it has been found that when finely divided, inorganic opacifying pigment is incorporated into the microcapsular structure, and the microcapsules are activated to provide air in the core thereof, the resulting microcapsular opacifiers provide an increase in opacity when they are incorporated into coatings, placed on fibrous substrates and into non-fibrous substrates to a degree heretofore unobtainable. When the present microcapsular oacifiers are incorporated into fibrous substrates they do not interfere with interfiber bonding. On the contrary, they do not interfere with interfiber bonding. On the contrary, the microcapsular opacifiers have been found to actually enhance interfiber bonding and act as "spot-welders" at points of contact between fibers. At the same time, the weight of such substrates is not substantially increased, since the microcapsule-containing pigment particle provides a greater increase in opacity than does the pigment particle, alone.

As will be hereinafter demonstrated, the employment of the present microcapsular opacifiers as a coating for a paper substrate results in an increase in the opacity of the substrate which is substantially greater than the corresponding increase in opacity obtained with an equivalent amount of the inorganic pigment or air-containing microcapsules alone, respectively.

DESCRIPTION OF PREFERRED EMBODIMENTS

The microcapsular opacifiers of the present invention comprise discrete, essentially spherical microcapsules containing air and pigment particles. The microcapsules have substantially continuous, solid walls and have a predetermined particle diameter. Broadly, the microcapsules may have an average particle diameter below about two microns. However, it is highly preferable that the microcapsules have an average particle diameter below about one micron, while the range of between about 0.25 and about 0.8 is especially preferred in the practice of the present invention.

The term "substantially continuous solid walls" as employed herein is intended to include solid-walled microcapsules which are still sufficiently porous to permit the escape of vaporizable core material in gaseous form therethrough upon the application of heat. The core material passes through the micropores of the capsule and is replaced therein with air. The core materials that may be employed in the production of the present microcapsular opacifiers are more particularly defined hereinafter.

Any suitable inorganic pigment may be incorporated into the air-containing microcapsular opacifiers. Such pigments include those finely divided materials which have been conventionally employed for the purpose of increasing opacity of substrates, such as paper or the like. Accordingly, suitable pigments include, for example, $TiO_2$, $CaCO_3$, $Al_2O_3 \cdot 3H_2O$, barytes ($BaSO_4$), clay, ZnO, ZnS, $CaSO_3$, $CaSiO_3$, talc, and the like. Preferred inorganic pigments for the purpose of the present invention are $TiO_2$, $CaCO_3$, $Al_2O_3 \cdot 3H_2O$, $BaSO_4$, clay and ZnO, with $TiO_2$ being especially preferred.

Any desired pigment particle size may be employed, so long as it is suitable for incorporation into the microcapsular structure. Thus, for example, $TiO_2$ having a particle size of between about 0.1 and about 0.35 micron, is highly suitable for the purposes of the present invention. Other suitable exemplary pigment particle sizes for use in the present invention are set forth below:

| Pigment: | Average particle size (microns) |
| --- | --- |
| ZnO | 0.12 |
| Barytes ($BaSO_4$) | 0.25 |
| $CaCO_3$ | 0.9 |
| Clay (Ultrawhite 90) | 2.0 |
| Trihydrated aluminum (paper ad) | 0.67 |

The microcapsular opacifiers of the present invention may be produced by a method which comprises providing discrete, essentially spherical precursor microcapsules having substantially continuous walls, said microcapsules having a predetermined average particle size and containing pigment and a gasifiable core material, such as a water-immiscible oily material selected from the group consisting of liquid and low melting oils, fats, and waxes, or a water-miscible liquid, such as low molecular weight alcohols, ketones, etc., and activating the microcapsules, e.g. by heating to a sufficient temperature, to substantially completely drive-off the water-immiscible oily core material from the microcapsules.

The precursor microcapsules of the present invention may be provided in any suitable manner, so long as the walls of the capsules have sufficient structural integrity to permit the gasifiable core material to pass therethrough when heated without being ruptured or deformed into a substantially nonspherical shape. For example, precursor microcapsules may be provided which have solid walls of a hydrophobic resin and contain minute droplets of an oil-in-water emulsion. Likewise, solid-walled, precursor microcapsules containing a water-immiscible oily material may be provided by adding a cross-linking or complexing agent to a colloidal solution of one or more emulsifying agents, wherein the emulsifying agents possess groups capable of reacting with a cross-linking or complexing agent.

Precursor oil-containing microcapsules may be produced by the technique known as "coacervation," which microcapsules can be employed for the production of the opacifiers of the present invention. Any microencapsulation method, whether chemical or physical, that is capable of yielding air-containing microcapsules containing inorganic pigment and having a suitable average particle diameter may be employed.

As previously mentioned, precursor microcapsules may be provided which have solid walls of a hydrophobic resin and contain minute droplets of an oil-in-water emulsion. The process for providing such microcapsules may be described briefly as a simple admixing of inorganic pigment with at least four ingredients. These ingredients are:

(A) A water-immiscible oily material selected from the group consisting of liquid and low melting oils, fats, and waxes;

(B) An amphiphilic emulsifying agent;

(C) At least one solution comprising a polymeric resin, said solution selected from the group consisting of:

(1) solutions comprising a hydrophobic, thermoplastic resin as the solute, said resin not having appreciable solubility in the oily material, and a water-and oil-miscible organic liquid as the solvent, said thermoplastic resin being capable of being separated in solid particle form from solution upon dilution with water, (2) solutions comprising a partially condensed thermosetting resin as the solute and water as the solvent, said resin condensate being capable of being separated in solid particle form from solution upon dilution with water, and (3) mixtures of (1) and (2); and, (D) Water in a quantity sufficient to cause the separation of at least one of said polymeric resins from solution.

The inorganic pigment of suitable particle size may be provided to the admixture for incorporation into the microcapsular structure in any suitable manner. For example, the pigment may be admixed with the oily material (A), an aqueous solution of the emulsifying agent (B), the resinous solution (C), or may be supplied via any or all of the foregoing. Desirable results are obtainable regardless of which mode of addition of pigment is employed.

The sequence or admixing of ingredients must be such that encapsulation of the emulsion by at least one of the synthetic resins in the admixture by dilution and ultimate separation from solution in solid particle form about a nucleus of oil in water upon dilution with water occurs no sooner than simultaneously with the formation of the emulsion. In other words, dilution, which can be performed by the addition of water to the oil-emulsifier-resin solution admixture or by the addition of the resin solution to the water-oil-emulsifier admixture, must be the final operation of the precursor microcapsule-forming process. Thus, in the first case, the emulsifying operation and the encapsulation operation can be considered to take place simultaneously, whereas, in the second case, the emulsion is already formed when it is admixed with the resin solution.

Although it is not intended to limit the present invention by any particular theory, it is postulated that the inorganic pigment particles may have some, although weak, emulsifying properties. Thus, the pigment particles may tend to go to the interface of the emulsion droplet rather than remain dispersed in the oil phase upon encapsulation. Thus, when encapsulation of the oily droplets takes place, the pigment particle becomes incorporated in the microcapsular structure at a point depending upon its position after the emulsification step, e.g., at the emulsion droplet interface or in the interior of the emulsion droplet. For example, the pigment particles may be completely encapsulated within the walls of the microcapsules, or they may protrude through the microcapsular walls. Accordingly, it will be understood that when the specification and claims refer to the microcapsules as "containing" the inorganic pigment, it is intended to include microcapsules having at least a portion of the inorganic pigment particle incorporated in the microcapsular structure. Likewise, the term "pigmented microcapsule" refers to microcapsules having at least a portion of the inorganic pigment particle incorporated in the structure of the microcapsule.

As previously mentioned, the microcapsules are activated by driving the core material, e.g., a water-immiscible oily material, from the pigmented precursor microcapsules thereby replacing the oily material with air. By "water-immiscible oily materials," as employed herein, is meant lipophilic materials which are preferably liquid, such as oils, which will not mix with water and which can be driven through the porous, solid walls of the particular precursor microcapsules employed. The discrete precursor-microcapsules of the present invention may be provided with low melting fats and waxes as the lipophilic material. However, oils are the preferred core material, since they do not require special temperature maintenance during the production of the microcapsules. Furthermore, oils are more easily volatized and driven through the micropores of the walls of the microcapsules by the application of heat.

In general, the lipophilic nucleus materials may be natural or synthetic oils, fats, and waxes or any combination thereof which can be removed from the microcapsules at the desired temperatures. Among the materials that can be employed in the process of the present invention are: mineral spirits, natural oils such as castor oil, soyabean oil, petroleum lubricating oils, fish liver oils, and essential oils, such as methyl salicylate and halogenated biphenyls; low melting fats and waxes.

The preferred lipophilic materials for employment in the present invention are those oils having a fairly high vapor pressure (high volatility), so that it can be completely and easily expelled through the micropores of the solid-walled microcapsules by the application of moderate amounts of heat. It is preferred to employ oils that can be expelled from the capsule walls at activation temperatures in the range of between about 25° and about 200° C., preferably between about 80° and about 125° C. It is especially preferred, for example, to employ oils which can be driven from the microcapsules at temperatures conventionally employed in the drying of paper webs or paper coatings, e.g., about 85° C. Preferred oils for use in the present invention include mineral spirits, chlorinated biphenyls, xylene, toluene, styrene, turpentine, and oils having a like volatility.

The emulsifying agents which may be used in the formation of the precursor microcapsules are "amphiphilic." That is, while the emulsifiers are generally preferentially soluble in one phase of the emulsion, they do possess an appreciable affinity for the other phase. It can be said, then, that in amphiphilic emulsifier gives oil a more hydrophilic nature than it had before, and, conversely, gives water a more lipophilic nature. Exemplary of the amphiphilic emulsifying agents which can be used in the instant invention are: naturally-occuring, lyophilic colloids including gums, protein and polysaccharides, such as, gum arabic, gum tragacanth, agar, gelatin and starch; and synthetic materials such as, hydroxyethyl cellulose, methyl cellulose, polyvinyl pyrrolidone, copolymers of methyl vinyl ether and maleic anhydride, polyvinyl alcohol, and the like.

The thermoplastic resins which may function as the encapsulating materials must be of a hydrophobic nature. In other worsd, they should not be capable of dissolving readily in water. While it is true that all resins exhibit some, even though very small hydrophilic properties, those resins acceptable for use in this aspect of the invention must for the most part be hydrophobic that is, more lipophilic than hydrophilic.

In general, the thermoplastic resins are to be macromolecular polymers, copolymers, block polymers, and the like. The preferred resins are those containing non-ionizable groups, since the extent to which a resin ionizes has an ultimate effect on the resin's hydrophilic-hydrophobic properties. Resins such as polyvinyl chloride and polystyrene are non-ionizable and are, therefore, preferred. However, other resins which can be used are polyvinyl acetate, vinyl chloride-vinylidene chloride copolymers, cellulose acetate and ethyl cellulose. Novolak resins which are linear, thermoplastic condensation products of phenol and formaldehyde, are also capable of being used as the thermoplastic resin. The novolaks are permanently fusible and soluble as long as their molecular structure is linear.

The selection of solvents for the resin to be used will depend on the specific encapsulating thermoplastic resin and the oil employed. Furthermore, the solvent must be sufficiently miscible with water in order for the resins to be separated from its solution when the oil-resin mixture is admixed with water.

In general, the solvents which are preferable are organic and of low polarity. Tetrahydrofuran has been used successfully with all of the resins heretofore mentioned and is, therefore, preferred. Examples of other solvents which are suitable include dioxane, cyclohexanone, methyl tetrahydrofuran, methyl isobutyl ketone and acetone.

A small amount of stabilizer may be incorporated with the solution of the thermoplastic resin to increase the stability of the resin towards heat, light and atmospheric oxygen. Examples of stabilizers which may be used include dibasic lead phosphite, dibasic lead stearate, tribasic lead sulfate monohydrate, dibutyltin maleate and others well known to the art. The use of such stabilizers for stabilizing thermoplastic resins is conventional.

The partially condensed thermosetting resins which may be used in various embodiments of this invention must also be of a hydrophobic nature in their solid, infusible state. These resins comprise that broad class of compositions defined as formaldehyde condensation products and include condensation reaction products of formaldehyde with phenols, such as, hydroxybenzene (phenol), m-cresol and 3,5-xylenol; carbamides, such as, urea; triazines, such as, melamine; amino and amido compounds, such as, aniline, p-toluenesulfonamide, ethyleneurea and guanidine; ketones, such as, acetone and cyclohexanone; aromatic hydrocarbons, such as, naphthalene; and heterocyclic compounds, such as thiophene. Under the influence of heat, these resins change irreversibly from a fusible and/or soluble material into an infusible and insoluble material.

The preferred formaldehyde condensation products employed in this invention are partially-condensed melamine-formaldehyde, phenol-formaldehyde and urea formaldehyde resins. These partially condensed resins can be prepared easily according to conventional practices. For example, a melamine-formaldehyde partial condensate or syrup, which may be used as an encapsulating agent, is prepared by refluxing 125 grams of melamine in 184 milliliters of formalin (37% by weight formaldehyde) neutralized to a pH of 8 with sodium carbonate. The mole ratio of formaldehyde to melamine in this reaction mixture is 2.3 to 1. The reaction continues for about 1 to 1½ hours at a temperature between 92 and 96° C. or until 1 volume of the condensate becomes turbid when diluted with 2 to 10 volumes of water. The condensate can be used immediately or can be stored for later use by adding a small amount, about 6 to 15% by weight, of methanol to the condensate. The methanol prevents any further rapid condensation of the resin solution upon standing and can be evaporated from the syrup either prior to or during the admixing operation. The resinous condensate or syrup, either with or without methanol, defines an aqueous solution of a partially-condensed, highly cross-linkable resin, said solution being capable of being diluted up to at least twice its volume before any appreciable separation of the resin from its solution occurs. After separation of the resin from its solution, the condensation reaction continues with time to effect additional cross-linking of the partially condensed materials. This additional condensation or cross-linking may be accelerated by the application of heat to the precipitated particles or by the additoin of an acidic catalyst, such as HCl, $NH_4Cl$ or the like. Additionally, microcapsules comprising walls of a thermosetting resin material become harder with the passage of time. However, an inhibitor, such as NaOH, $NH_4OH$, or the like may be added to stop the curing of the resinous material when the desired hardness is obtained.

Preferably, a small amount of a stabilizer is added to the thermosetting resin syrup in order to improve the stability of the resin towards heat, light and oxygen. For example, from about 0.3 to 0.5% by weight of a conventional stabilizer such as zinc stearate or dibasic lead stearate may be used.

As previously mentioned, the dilution of either one or both of the resin solutions should take place as the final operation of the process, which dilution takes place slowly and under conditions of brisk agitation. In other words, the sequence of admixing the ingredients may generally proceed in any order so long as the separation or precipitation of a resin from solution results in the encapsulation of emulsion droplets. Thus, when a single resin is to be used, the order of additions must be such that either water or the resin solution is the last addition. Precursor microcapsules may be provided which contain a dispersion comprising one or more emulsion-containing microcapsules. Thus, once an oil-in-water emulsion is encapsulated, a second dilution operation may be effected by simply adding another resin solution to the aqueous dispersion of the first-formed microcapsules. Consequently, microcapsules containing microcapsules are produced.

Brisk agitation is required in order to obtain very small droplets of the emulsion and, ultimately, very small capsules. As previously mentioned, microcapsules having average particle diameters ranging from below about one micron are preferred, with between about 0.25 and about 0.8 micron being especially preferred according to the practice of this invention. Agitation should be conducted in a manner such that when preparing the microcapsules, the emulsion droplets have a predetermined average diameter. Preferably, the emulsion droplets are provided with an average diameter of between about 0.25 and about 0.8 micron prior to encapsulation, so that upon completion of encapsulation the average final particle diameter is between about 0.8 and about 1.0 micron. Agitation may be achieved by means of a high speed mixer or impeller, by ultrasonic waves or by other conventional means. Brisk agitation need be maintained only in the zone of admixing and not throughout the entire volume of the liquid to which the outer liquid is being added.

The slower the speed of admixing, the more impermeable the capsule walls will be to both internal and external leakage. Slow admixture may be achieved by any of the conventional means, such as by spraying in the form of a fine mist or by dripping.

Regardless of the manner of providing the pigment and oil-containing precursor microcapsules employed, the microcapsules are activated, e.g., by heating to temperatures which cause the oily material to volatilize and pass through the micropores in the solid walls of the microcapsules. The heating of the precursor microcapsules may take place at any time subsequent to their formation. In the case of the pigmented microcapsular opacifiers to be used on fibrous substrates, the oily material may be driven from the microcapsules either before or subsequent to their being coated onto the substrate. For example, a dispersion of the oil-containing microcapsules may be spray-dried so as to provide air-containing microcapsules, which may be then coated onto the substrate.

The pigment-containing precursor microcapsules may contain a water-miscible core material. For example, if the oily material is driven from the suspended microcapsules prior to their being coated onto or incorporated into a substrate or a surface finish, the oily material may be replaced by another liquid such as water or whatever other liquid may constitute the medium in which the microcapsules are suspended. Likewise, a dispersion of the microcapsules having a water-miscible core material may be spray-dried to provide the air-containing microcapsules of the present invention.

Referring now to the drawings, FIG. 1 illustrates the various alternative modes of producing a substrate coated with the microcapsular opacifiers of the present invention.

In the encapsulating process shown in FIG. 1, an oily material, such as a chlorinated biphenyl is provided for the microcapsular core. This material is admixed with an aqueous solution of an emulsifying agent, e.g., methyl cellulose, and a finely divided inorganic pigment, e.g., $TiO_2$. The oily material and the aqueous pigment-containing admixture is agitated until emulsion droplets having an average diameter of a predetermined size, e.g., less than one micron, are produced. Next, an aqueous solution of an encapsulating agent, e.g., urea formaldehyde, is added to the emulsion with brisk agitation, and solid-walled microcapsules are immediately formed. Solid-walled microcapsules thereby become invested with at least one emulsion droplet and an inorganic pigment particle is provided in the microcapsular structure. As previously mentioned, the pigment may be supplied to the system in admixture with the oily material, a solution of the encapsulating agent or with the emulsifying agent as illustrated.

The microcapsules may be optionally cured, e.g., by the addition of glyoxal or other curing agent, and then any one of various procedures may be followed to activate the microcapsules and employ them as opacifying agents. Thus, the microcapsular dispersion may be activated by heating to a temperature of, for example, between about 25° and about 200° C. preferably between about 80° and about 180° C. to drive off the oily material through the micropores of the capsule walls, for example, the capsules may be spray-dried at 125° C. Next the microcapsular opacifiers may be admixed with a binder and coated onto a substrate and dried. Any suitable temperatures may be employed to drive the oily material from the microcapsules, so long as the microcapsular structure is not destroyed.

Alternatively, microcapsular opacifiers may be added to a dispersion containing a binder and cellulose fibers. The resulting admixture of the opacifiers and fibers may be formed into a web and dried.

Still another alternative is to coat pigmented oil-containing precursor microcapsules onto a substrate, e.g., a fibrous web, and then heat the microcapsules to drive the oil therefrom.

In the case of surface finishes, such as paints, the volatilizable core material may be driven from the pigmentized, air-containing microcapsules either prior or subsequent to their incorporation into the paint as opacifiers.

Figure 2:
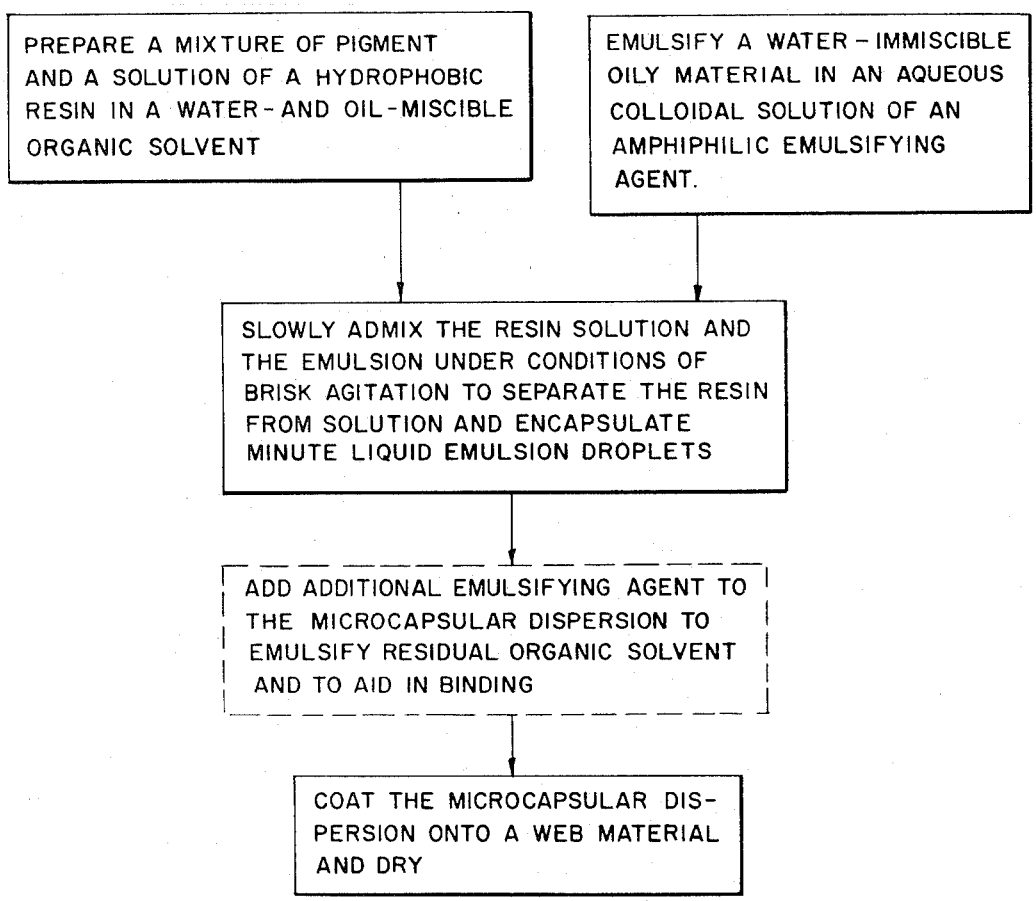

FIG. 2 shows a process for the formation of pigmented precursor microcapsules in which an oil-in-water emulsion is encapsulated by a thermoplastic resin. The resin, in the form of a solution, in which finely divided inorganic pigment is provided, is admixed slowly with the emulsion. However, the admixture may alternatively involve the addition of the emulsion to the resin solution. In either case, the thermoplastic resin separates from its original solution as minute, solid-walled pigmentized particles by reason of the dilution of the resin solution by the water of the emulsion. Each of the solid-walled particles may contain one or more oil-in-water emulsion droplets in addition to a pigment particle. It should be noted that the resin should not have appreciable solubility in the core material.

On completion of the dilution operation, the admixture constitutes the minute resin, pigment-containing particles (each containing a droplet(s) of the emulsion) evenly dispersed in an aqueous medium comprising water, the solvent for the resin and residual emulsifying agent. Essentially all of the oily material (in emulsion form) is contained within the resin particles. The thus-formed microcapsular dispersion may be heated to drive off the oil or may be coated directly onto a web material and heated to produce a coating of opacifiers. As an optional step, a small amount of a binder material may be added to the microcapsular dispersion prior to coating. Such addition aids in binding the microcapsules to the web material.

Figure 3:
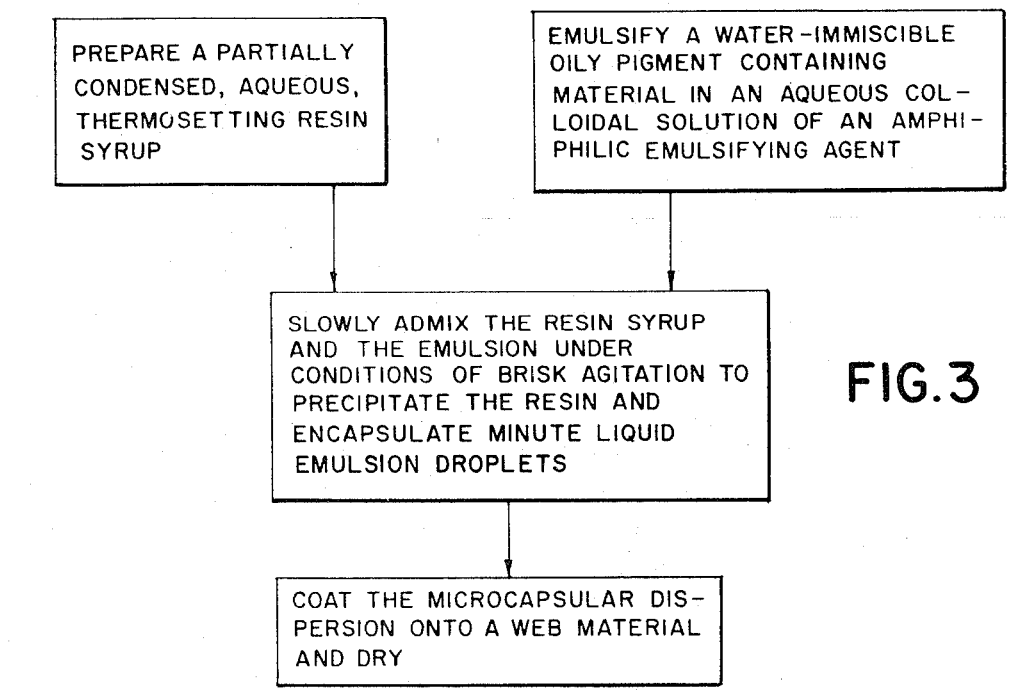
Figure 4:
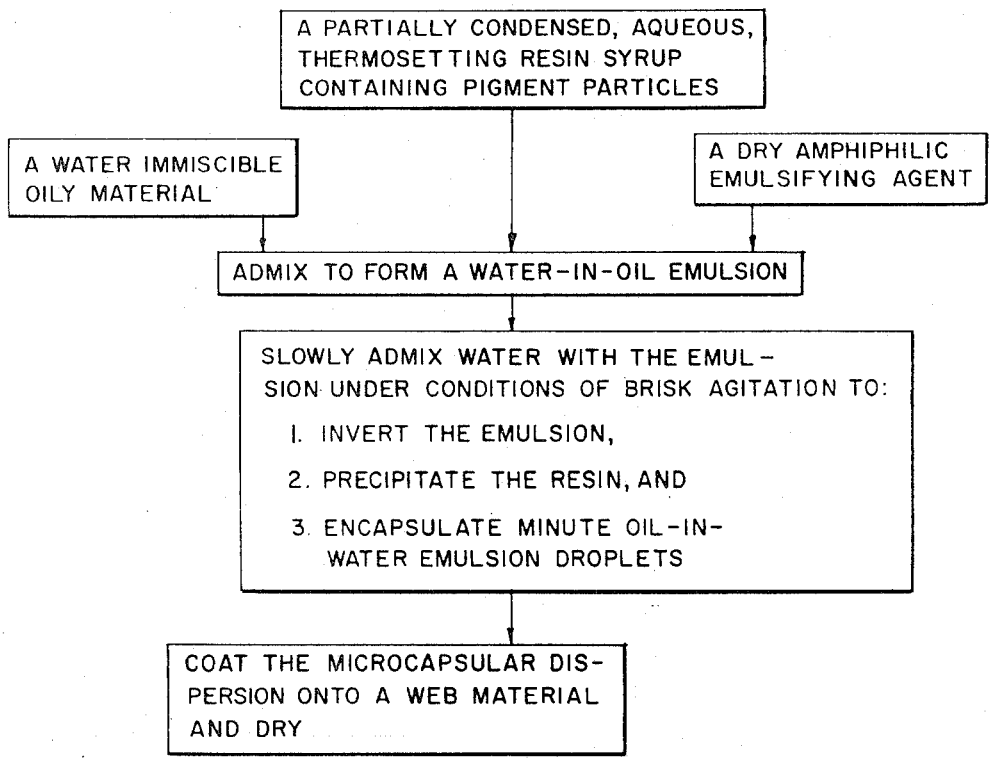

FIGS. 3 and 4 show two alternative processes of the microencapsulation of a pigmentized oil-in-water emulsion with a thermosetting resin. In FIG. 3, the process shown is substantially the same as that shown in FIG. 2 with the exception that a partially condensed, aqueous, thermosetting resin syrup is substituted for the thermoplastic resin solution. Although not shown in FIG. 3, the optional step of adding a binder material to the microcapsular dispersion prior to coating may be performed.

The process as shown in FIG. 4 involves first preparing a water-in-oil emulsion by admixing the oil material with an amphiphilic emulsifying agent and a thermosetting resin syrup containing pigment particles. By slowly admixing water with this emulsion, the emulsion will gradually invert to an oil-in-water emulsion. The dilution of the initial emulsion with water simultaneously induces the precipitation of the thermosetting resin, thereby encapsulating the oil-in-water emulsion and pigment particles within the precipitated resin particles. The resulting microcapsules, which are evenly dispersed throughout an aqueous medium containing residual emulsifying agent, may then be coated onto a web material and dried to drive off the oil, or, alternatively, an additional amount of a binder may be admixed with the dispersion prior to coating, such as shown in FIG. 2.

Figure 5:
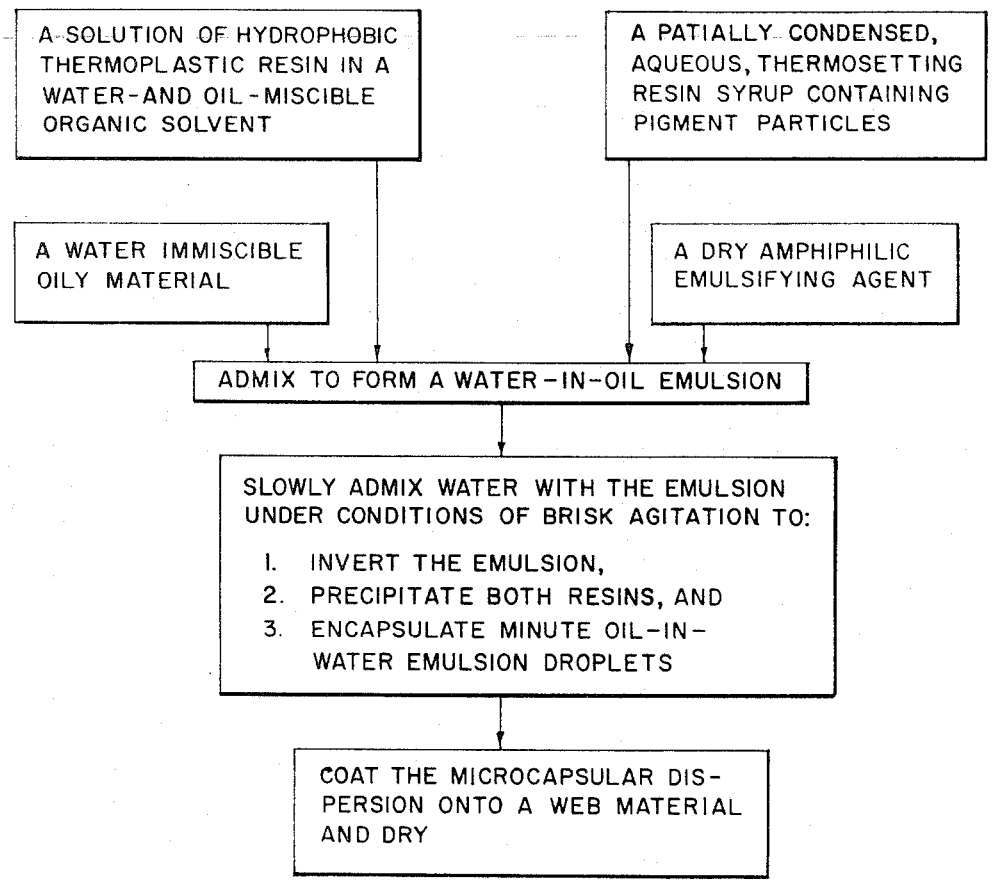
Figure 6:
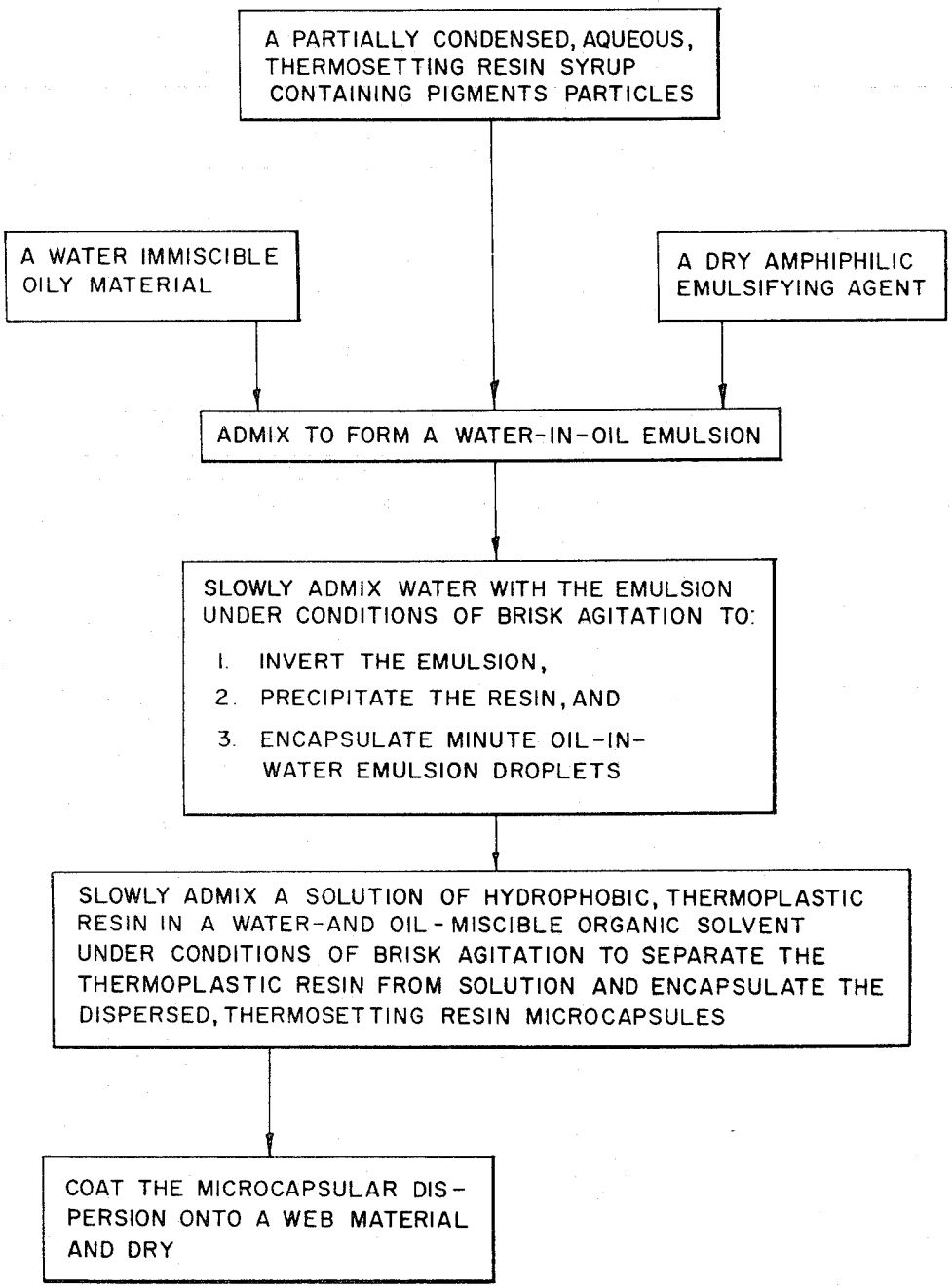
Figure 7:
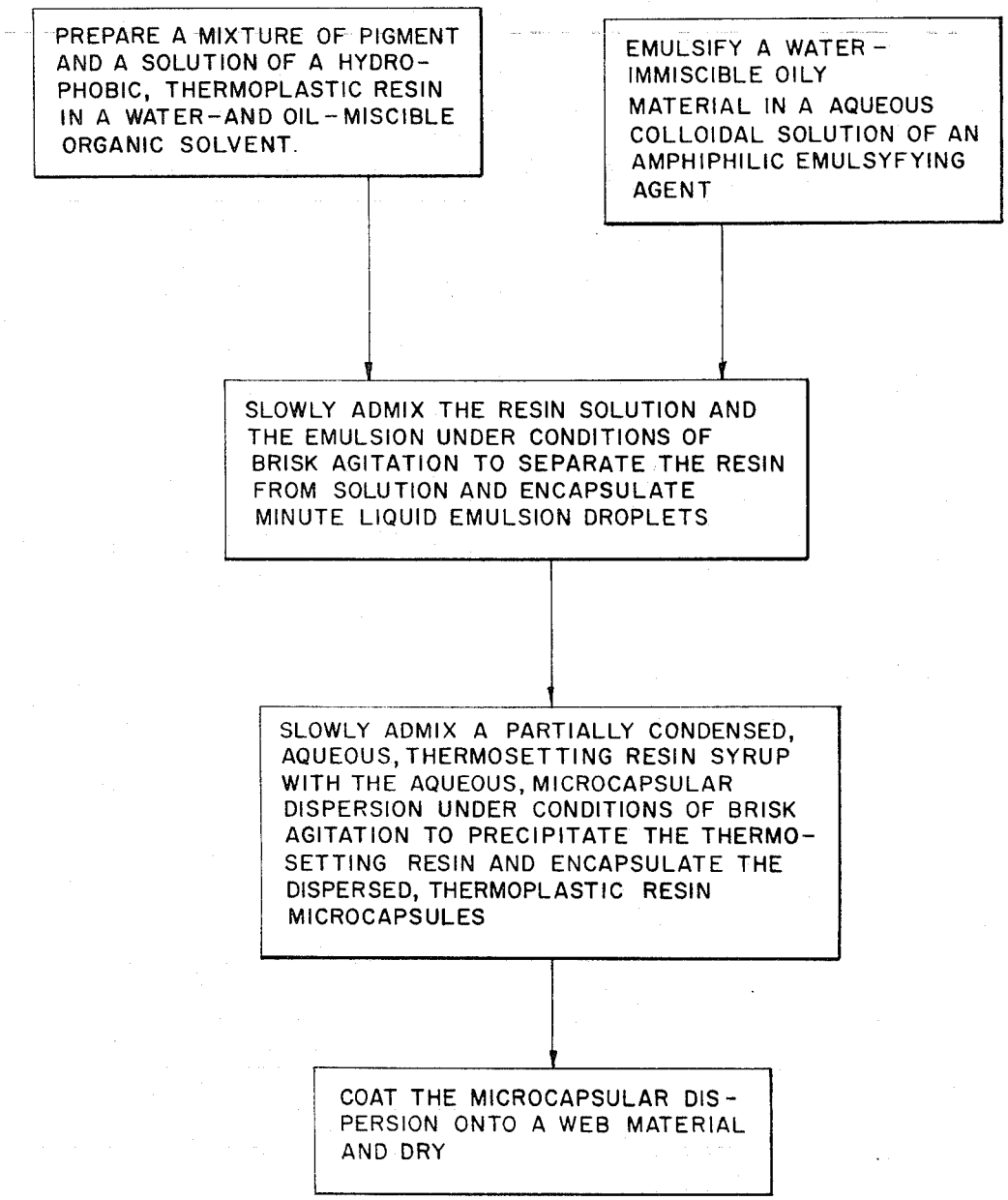

FIGS. 5, 6, and 7 illustrates three alternative processes for the microencapsulation of an oil-in-water emulsion and the provision of pigments in the microcapsular structures involving both a thermoplastic and a thermosetting resin. In FIG. 5, a process is shown which may be considered a modification of the process shown in FIG. 4. More specifically, the sequence of admixing in the FIG. 5 process is identical to that of FIG. 4, except that a solution of a thermoplastic resin in a water-and oil-miscible solvent is added to the initial emulsion prior to dilution with water. On subsequent dilution the emulsion inverts and the resins precipitate to encapsulate the emulsion droplets and provide pigment particles in the microcapsular structure.

Both FIGS. 6 and 7 show the encapsulation of microcapsules wherein the initial microencapsulation of the oil-in-water emulsions takes the form of the processes shown in FIGS. 4 and 2, respectively. Thus, in the process of FIG. 6 a thermoplastic resin solution containing pigment particles is admixed with the aqueous dispersion of thermosetting resin microcapsules produced according to the process of FIG. 4. The water which is present in the dispersion effects a dilution of the thermoplastic resin solution, which dilution induces the precipitation of the thermoplastic resin. Essentially all of the previously formed thermosetting resin microcapsules are, thereby, encapsulated by the newly precipitated thermoplastic resin. In addition, some of the residual emulsifying agent in the dispersion medium is caused to be entrapped within the thermoplastic resin microcapsules.

Similarly, in the process of FIG. 7, a partially condensed, aqueous, thermosetting resin syrup containing pigment particles is admixed with the aqueous dispersion of thermoplastic resin microcapsules produced according to the process of FIG. 2. The water in the dispersion causes the precipitation of the thermosetting resin, thus, encapsulating the dispersed pigmented, thermoplastic resin microcapsules.

Regardless of the method employed for forming the pigmented, precursor microcapsules, the microcapsules may be activated and thereby provided with an air-containing core, in the manner previously described.

The substrate employed in the present invention may be either a fibrous substrate, such as paper, a non-fibrous substrate, such as a film or a surface finish, such as paint. However, the microcapsules, such as those produced by the herein disclosed processes are also capable of being coated onto other fibrous substrates, such as plastic and fabric or textile webs.

Generally, there is sufficient residual emulsifying agent remaining in the microcapsular dispersion after separation of the resin and encapsulation of the emulsion that no additional binding agent need be used if the capsules are to be applied to a fibrous substrate. Materials such as gelatin and gum arabic have been used conventionally as binding agents. However, it is preferable to add an additional binder such as hydroxyethyl cellulose, methyl cellulose or starch to the system.

According to still another process for forming pigmented, oil-containing precursor microcapsules, a primary oil-in-water emulsion is formed, which emulsion comprises the water-immiscible oily material previously described and pigment particles. The oily material is dispersed in the form of microscopic droplets in a colloidal solution of one or more emulsifying agents. At least one of the said emulsifying agents must possess groups capable of reacting with a cross-linking or complexing agent to form a capsule wall around said dispersed microscopic droplet. The cross-linking or complexing agent is slowly added to the emulsion with brisk agitation, and this is continued until the final microcapsules are formed having substantially continuous solid walls, as hereinabove defined. The emulsion containing the precursor microcapsules may be heated to produce the opacifiers or may be directly coated onto a web material as previously described. Alternatively, the microcapsules may be separated from the emulsion by physical means, such as filtration, centrifugation, or spray drying. Subsequently, the microcapsules may be redispersed in a solution of a binder and coated onto a web material or may be dispersed in a non-fibrous substrate.

The encapsulating material of this aspect may also be an emulsifying agent which is self-complexing or self-cross-linking. In such a case the addition of a different cross-linking or complexing agent is unnecessary. Exemplary of emulsifying agents having the aforesaid characteristics which permit their employment are: naturally-occurring colloids including gums, proteins and polysaccharides, such as gum tragacanth, guar gums and gelatin; and synthetic materials such as polyvinyl alcohol and copolymers of methyl vinyl ether and maleic anhydride. Suitable copolymers of methyl vinyl ether and maleic anhydride are commercially available from the General Aniline and Film Corporation and are sold under the trademark "Gantrez." These water-soluble copolymers have the general structure

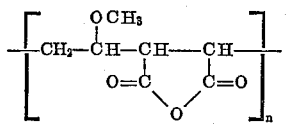

The above list comprises both gellable and non-gellable emulsifying agents, e.g., gelatin and polyvinyl alcohol. Emulsifying agents which are self cross-linking or self-complexing include certain derivatives of guar gum, such as those which are commercially available from Stein, Hall and Company sold under the trademark "Jaguar." These materials are natural hydrophilic colloids that are produced by the extraction of guar gum from the endosperm portion of eyamopsis tetragonalobus seeds and are comprised of a straight chain galacto mannan polysaccharide made of many mannose and galactose units linked together.

The cross-linking or complexing agents employed with the aforesaid emulsifying agents are selected from three broad categories: (1) monomeric organic compounds, such as the aldehydes, e.g., formaldehyde, glyoxal and other formaldehyde donors, trioxane ethanolamine, and ethylene diamine; (2) ordinary inorganic compounds, such as sodium borate and boric acid; and (3) macromolecular species, such as gelatin, gum tragacanth, and methylcellulose.

While some of the cross-linking or complexing agents are suitable for use with a plurality of emulsifying agents, others are not. Thus, the preferred cross-linking or complexing agent-emulsifying agent pairs include: (1) gelatin with an aldehyde, such as formaldehyde; (2) polyvinyl alcohol with sodium borate; (3) copolymers of methyl vinyl ether and maleic anhydride with any one of gelatin, gum tragacanth, ethanolamine, ethylene diamine, polyvinyl alcohol; (4) guar gum derivatives with any one of sodium borate or methylcellulose; and (5) self-complexing guar gum derivatives with themselves.

The cross-linking or complexing agent is utilized in amounts sufficient to result in the formation of microcapsules. The relative amounts vary with the particular system, and may be easily determined in each case.

Figure 8:
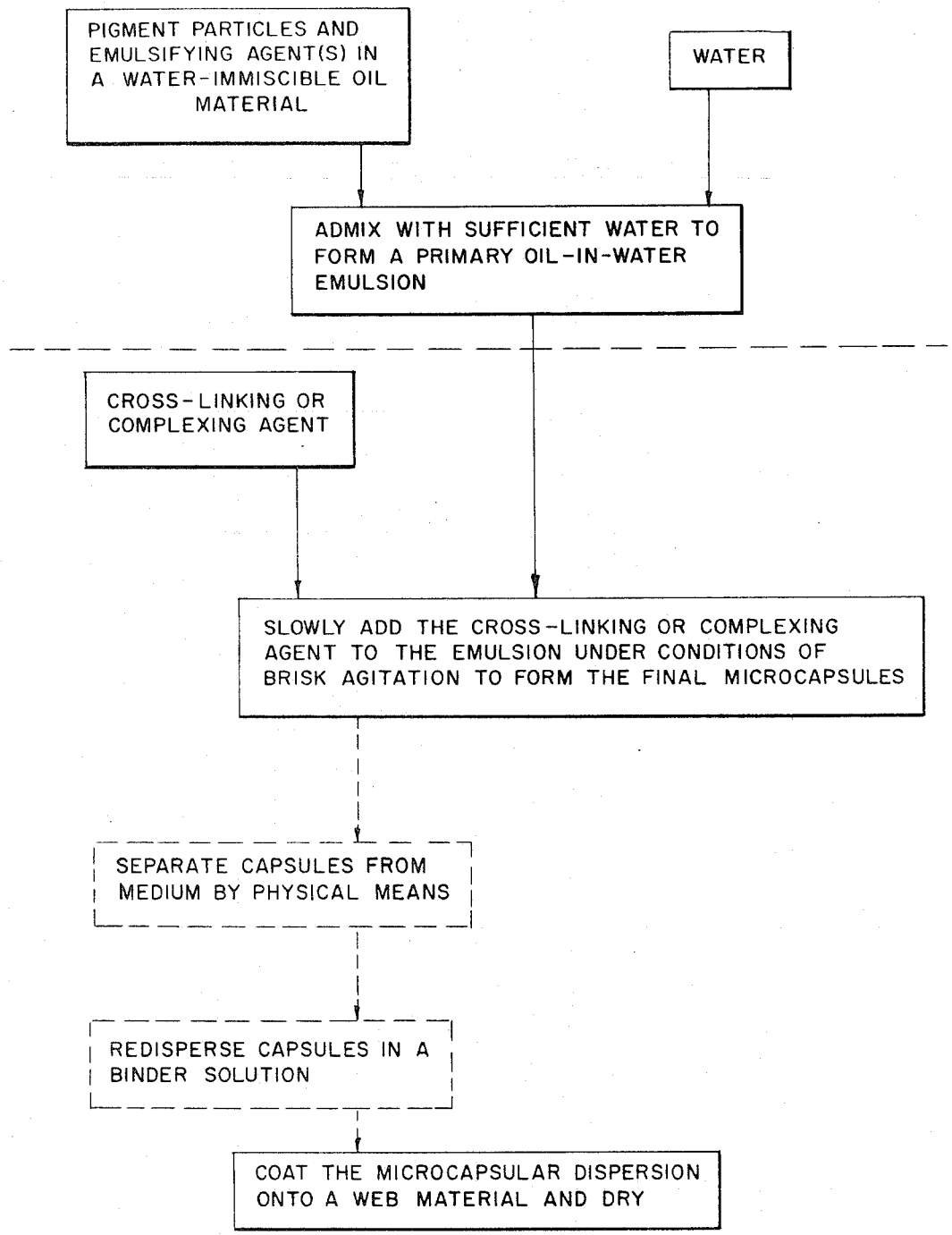
Figure 9:
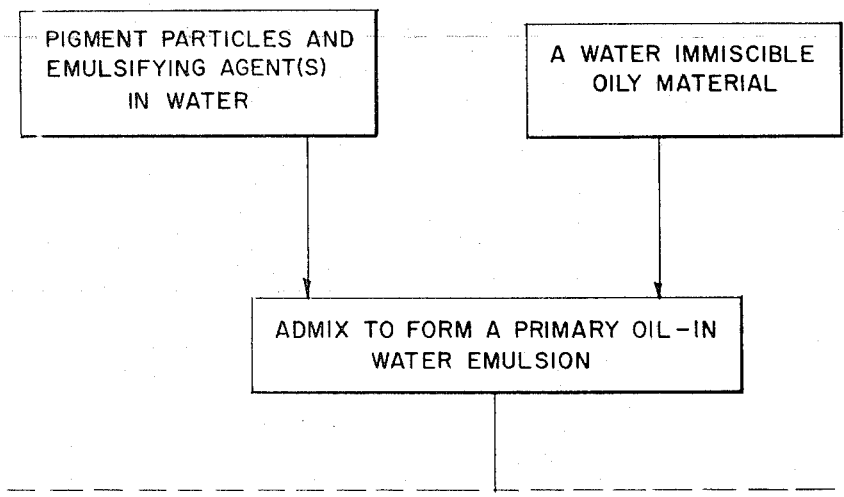

FIGS. 8 and 9 of the attached drawings illustrate the processes for the provision of pigmented precursor microcapsules mentioned above. In the process shown in the flow sheet of FIG. 8, a primary oil-in-water emulsion containing inorganic pigment is prepared by dissolving the emulsifying agent or combination of agents and pigment particles in the oily material and subsequently adding water to emulsify.

The water may be added to the emulsifying agent-oil mixture either quickly or slowly with agitation. If the water is added slowly to the oil phase containing the emulsifying agent or agents, a water-in-oil emulsion is formed, which eventually is inverted to an oil-in-water emulsion with the further addition of water. Such an inversion step results in a more stable emulsion with some systems, e.g., a methyl cellulose-guar gum derivative system.

The temperature of emulsification may be varied over a broad range. However, the temperature must be kept above the gelling point of the emulsifying agent or agents only if a gelable emulsifying agent is used. Therefore, when a non-gelable emulsifying agent is used, e.g., polyvinyl alcohol, the temperature during emulsification can be varied appreciably without altering the final desired results.

Subsequent to the emulsification process, the cross-linking or complexing agent is added to the oil-on-water emulsion, slowly, and with brisk agitation to form the precursor microcapsules. Agitation may be achieved by means of a high speed mixer or impeller, by ultrasonic waves or by other conventional means so long as microcapsules having a particle size below one micron are formed, for example.

If the emulsifying agent is of the self-complexing variety, e.g., a self-complexing guar gum derivative, the cross-linking or complexing agent comprises the same material as the emulsifying agent.

Alternatively, the emulsion containing the microcapsules may be either coated directly onto a web material and dried or the microcapsules may be separated from the emulsion by some physical means such as filtration, spray drying centrifugation; redispersed in a solution of a binder; coated onto a web material and dried. Removal of the oil from the interior of the capsule may be done either before or after coating, as before. Suitable binders include methyl cellulose, starch, casein, polyvinyl alcohol, synthetic latex, and styrene-butadiene rubber. Alternatively, materials such as urea-formaldehyde or melamine-formaldehyde condensates may be employed.

In the encapsulation process illustrated in FIG. 9, the oil-in-water emulsion is prepared by admixing pigment particles and the emulsifying agent (or agents) with water and subsequently adding the oily material to the water solution with agitation until complete emulsification has occurred. The emulsion may then be diluted with water to give the desired viscosity suitable for coating. Capsule diameters suitable for producing the microcapsular opacifiers of the present invention are likewise obtainable by the process of FIG. 8 by adding cross-linking or complexing agents with agitation as previously described.

Figure 10:
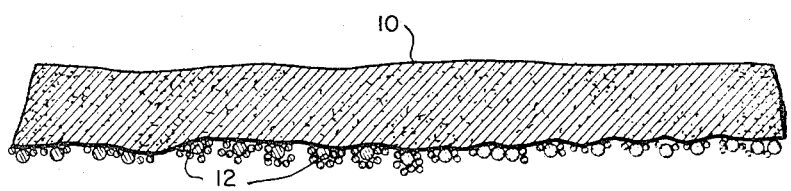

FIG. 10 represents a cross-sectional view of a portion of a fibrous substrate produced according to the practices of the present invention wherein a paper web material 10 contains a substantially uniform coating of pigmented, air-containing opacifiers 12 having a predetermined average diameter. The binding agent employed to secure the opacifiers to the paper web is not shown.

The following examples illustrate the production of pigmented, air-containing microcapsular opacifiers and constitute the best modes contemplated for carrying out the present invention. The ream of paper as employed in the following examples comprises 500 sheets of 25 inch by 38 inch paper or a total of 3300 square feet of paper. Likewise, the paper employed in the following examples is bond paper (32.5 pounds per ream) having a TAPPI opacity of 73 percent points prior to coating. The titanium dioxide pigment employed in the following examples has a particle diameter of about 0.1 to about .35 micron.

EXAMPLE 1

Six grams of $TiO_2$ are dispersed in 366 grams of an 8.2% (by weight) methyl cellulose (15 centipoises) solution in water. Into the above dispersion, 200 grams of mineral spirits are emulsified in a Waring Blendor. Emulsification is continued until the average particle diameter of the emulsion droplets is about 0.8 micron. Subsequently, 90 grams of an aqueous B-stage urea-formaldehyde condensate (65% by weight solids) are slowly added to the emulsion with continued agitation in order to induce encapsulation. Pigment and oil-containing precursor microcapsules thereby are formed.

The pigment and oil-containing microcapsules are coated onto a web comprising bond paper. The bond paper is coated with 5.42 pounds per ream of pigment and oil-containing precursor microcapsules. The paper web is dried at a temperature of about 85° C. for a period of time sufficient to drive-off the mineral spirits and produce the air-containing microcapsules, viz, 15 minutes. These microcapsules have an unexpectedly high TAPPI opacity of 92.2% points. (This corresponds to a 19.1% points increase in the opacity of the uncoated paper.) The weight of the paper web is only increased to the extent of 4.5 pounds per ream of paper.

An equivalent amount of $TiO_2$ per se (4.5 pounds per ream) is coated on the same paper. The corresponding increase in TAPPI opacity is only 14.10% points, as compared with the 19.1% points increase employing the pigment and air-containing opacifiers of the present invention.

EXAMPLE 2

Titanium dioxide in an amount of 10.5 grams is dispersed in 366 grams of an 8.2% (by weight) of a (15 centipoises) methyl cellulose solution in water, emulsified with 150 grams of mineral spirits and encapsulated with 40 grams of a B-stage ureaformaldehyde (65% solids) solution.

The average capsule diameter is about 0.8 micron. The pigment and oil-containing microcapsules are coated on bond paper and heated at 85° C. to remove the mineral spirits. A final coat weight of 4.2 pounds per ream of the pigment and air-containing microcapsules results in a 16.9% points increase in the TAPPI opacity of the paper. An equivalent coat weight (4.1 pounds per ream) of $TiO_2$ gives a corresponding increase in opacity of only 13.25% points.

EXAMPLE 3

The procedure of Example 2 is repeated except that 20 grams of $TiO_2$ are employed and the emulsifier, urea-formaldehyde, is employed in the amount of 60 grams. The average particle diameter of the capsules is 0.8 micron. A coat weight of 4.0 pounds per ream of the pigment and air-containing microcapsules results in a 19.61% points increase in the TAPPI opacity of the base paper. An equivalent amount (4.0 pounds per ream) of $TiO_2$ yields only a corresponding increase in opacity of 13.05% points.

EXAMPLE 4

The procedure of Example 3 is repeated except that 30 grams of $TiO_2$, 200 grams of mineral spirits and 90 grams of urea-formaldehyde are employed in the formation of the pigmented, air-containing microcapsules. The average particle diameter of the microcapsules is 1.3 microns.

A coat weight of 4.0 pounds per ream of air-containing microcapsules results in an increase in TAPPI opacity of the base paper of 16% points. The corresponding increase in opacity for an equivalent amount (4.0 pounds per ream) of $TiO_2$ is 13.05% points.

EXAMPLE 5

Again, the procedure of Example 3 is repeated, except that 2.5 grams of $TiO_2$ and 10 grams of urea-formaldehyde are utilized in the preparation of the precursor microcapsules. The average particle diameter of the resulting pigmented, air-containing microcapsules is a preferred 0.8 micron.

A coat weight of 4.9 pounds per ream of air-containing microcapsules yields an increase in the opacity of the base paper of 18.5% points, whereas, the same coat weight of $TiO_2$ results in only a 14.9% increase in opacity.

EXAMPLE 6

Six grams of $CaCO_3$ having a particle size of 0.9 micron are dispersed in 366 grams of an 8.2% (by weight) methyl cellulose (15 centipoises) solution in water, emulsified with 200 grams of mineral spirits and encapsulated with 90 grams of urea-formaldehyde. The average particle diameter is 1.0 micron. A coat weight of 5.5 pounds per ream of the pigment and air-containing microcapsules results in an increase of 16.0% points in TAPPI opacity of the base paper.

When an equivalent amount of $CaCO_3$ (5.5 pounds per ream) is coated on the same paper, the corresponding increase in TAPPI opacity is only 10.8% points.

EXAMPLE 7

The procedure of Example 6 is repeated using 6 grams of ZnO pigment having a particle size of 0.12 micron instead of $CaCO_3$. A resulting coat weight of 4.7 pounds per ream of the air-containing microcapsules yields an increase in the TAPPI opacity of the base paper of 15.6% points. An equivalent coat weight (4.7 pounds per ream) of ZnO pigment, per se, on the same base paper gives a corresponding increase in opacity of only 7.5% points.

EXAMPLE 8

Example 6 is repeated using 6 grams of clay (Ultra-White-90) having a particle size of 2.0 microns instead of $CaCO_3$. A resulting coat weight of 7.3 pounds per ream of pigment and air-containing microcapsules gives an increase in the TAPPI opacity of the base paper of 19.1% points as compared to an increase of only 8.5% points of an equivalent coat weight (7.3 pounds per ream) of the clay above on the same base paper.

EXAMPLE 9

Example 6 is repeated using 6 grams of $BaSO_4$ having a particle diameter of 0.25 micron, instead of $CaCO_3$. A resulting coat weight of 7.1 pounds per ream of the pigment and air-containing microcapsules gives an increase in the TAPPI opacity of the base paper of 18.9% points. An equivalent coat weight (7.1 pounds per ream) of $BaSO_4$ on the same base paper yields a corresponding increase in opacity of only 3.9% points.

EXAMPLE 10

Example 6 is repeated wtih the exception that 6 grams of trihydrated alumina having a particle diameter of 0.67 micron are employed instead of $CaCO_3$. A resulting coat weight of 5.9 pounds per ream of the pigment and air-containing microcapsules gives an increase in the TAPPI opacity of the base paper of 17.3% points. An equivalent coat weight of the alumina pigment on the same base paper yields a corresponding increase in opacity of only 12.8% points.

EXAMPLE 11

Titanium dioxide in an amount of 2 grams is dispersed in 366 grams of an 8.2% (by weight) of a 15 centipoises methyl cellulose solution in water, emulsified with 150 grams of mineral spirits and encapsulated with 90 grams of a B-stage urea-formaldehyde (65% by weight) solution in water. The average microcapsule diameter is 0.8 micron. To the microcapsular dispersion 10.0 grams of a 30% by weight citric acid solution in water are added and the dispersion is cured at 35° C. for 30 minutes.

The cured microcapsules are coated onto bond paper and dried at 85° C. to remove the mineral spirits. A coat weight of 7.4 pounds per ream of the air-containing microcapsules results in an increase in the TAPPI opacity of the base paper of 19.4% points. The corresponding increase in opacity for an equivalent coat weight of $TiO_2$ pigment, per se, is only 18.6% points.

EXAMPLE 12

One hundred grams of mineral spirits are emulsified with 188 grams of an 8.2% by weight methyl cellulose solution in water. Three grams of $TiO_2$ are dispersed in 45 grams of a urea-formaldehyde (65% by weight) solution in water and added slowly to the above emulsion. The average particle diameter is 0.8 micron.

The microcapsular dispersion is coated onto bond paper and heated at 85° C. to drive-off mineral spirits. A coat weight of 6.9 pounds per ream of the pigment and air-containing microcapsules results in an increase in TAPPI opacity of the base paper of 18.9% points. An equivalent coat weight of $TiO_2$ yields a corresponding increase in TAPPI opacity of 18.1% points.

EXAMPLE 13

Three grams of $TiO_2$ are dispersed in 100 grams of mineral spirits. To this mixture, 15 grams of (15 centipoises) methyl cellulose and 203.0 grams of water are added and emulsified for 15 minutes. To the emulsion, 45 grams of a (65% by weight) urea-formaldehyde solution in water are added.

The average microcapsule diameter is 1.7 micron. The microcapsular dispersion is coated onto bond paper and heated at 85° C. to remove the mineral spirits. A coat weight of 4.66 pounds per ream of the air-containing microcapsules yields an increase in the TAPPI opacity of the base paper of 15.0% points. An equivalent coat weight of TiO₂, per se, results in a 14.4% points increase in opacity.

The opacifiers of the present invention may be employed in all known applications where conventional opacifying pigments have been used for inducing or increasing opacity. For example, the opacifiers may be used in paints, as inks, in plastics, on metals, glass, wood, plaster, in films, on fabrics, paper and the like. As previously mentioned, expressions such as "microcapsules containing pigments" and "pigmentized microcapsules" are intended to include microcapsules having at least a portion of the pigment particle incorporated in the microcapsular structure.

Although the invention has been described in considerable detail with particular reference to certain preferred embodiments thereof, variations and modifications can be effected within the spirit and scope of the invention as described hereinbefore, and as defined in the appended claims.

What is claimed is:

1. A coating upon a substrate, said coating of discrete, substantially spherical, air-containing microcapsules having substantially continuous, organic, polymeric, solid walls and an average diameter of below about 2 microns, said microcapsules additionally having pigment particles incorporated in the microcapsular structure.

2. A coating as defined in claim 1 wherein said microcapsules have an average particle diameter of between about 0.1 and about 1 micron.

3. A coating as defined in claim 1 wherein said pigment is a member selected from the group consisting of $TiO_2$, $BaSO_4$, $ZnO$, $CaCO_3$, $Al_2O_3 \cdot 3H_2O$.

4. The coating of claim 3 wherein said pigment is $TiO_2$.

5. The coating of claim 1 wherein said polymeric, solid walls comprise polyvinyl alcohol, urea-formaldehyde, or melamine-formaldehyde.

6. The coating of claim 5 wherein said solid walls comprise polyvinyl alcohol.

7. The coating of claim 1 wherein said pigment particles protrude through the walls of said microcapsules.

8. The coating of claim 1 wherein said pigment particles are encapsulated within the walls of said microcapsules.

9. A paint composition containing discrete, substantially spherical, air-containing microcapsules having substantially continuous, organic, polymeric, solid walls and an average particle diameter or below about 2 microns, said microcapsules additionaally having pigment particles incorporated in the microcapsular structure.

10. The paint composition of claim 9 wherein said inorganic pigment is a member selected from the group consisting of $TiO_2$, $BaSO_4$, $ZnO$, $CaCO_3 \cdot 3H_2O$.

11. The paint composition of claim 10 wherein said pigment is $TiO_2$.

12. The paint composition of claim 9 wherein said polymeric, solid walls comprise polyvinyl alcohol, urea-formaldehyde or melamine-formaldehyde.

13. The paint composition of claim 12 wherein said solid walls comprise polyvinyl alcohol.

14. The paint composition of claim 9 wherein said pigment particles protrude through the walls of said microcapsules.

15. The paint composition of claim 9 wherein said pigment particles are encapsulated within the walls of said microcapsules.

16. The paint composition of claim 9 wherein said microcapsules have an average particle diameter between about 0.1 and about 1.0 micron.

17. A film containing discrete, substantially spherical, air-containing microcapsules having substantially continuous, organic, polymeric, solid walls and an average particle diameter of below about 2 microns, said microcapsules additionally having pigment particles incorporated in the microcapsular structure.

18. The film of claim 17 wherein said pigment particles protrude through the walls of said microcapsules.

19. The film of claim 17 wherein said pigment particles are encapsulated within the walls of said microcapsules.

20. The film of claim 17 wherein said pigment is a member selected from the group of $TiO_2$, $BaSO_4$, $ZnO$, $CaCO_3 \cdot 3H_2O$.

21. The film of claim 20 wherein said pigment is $TiO_2$.

22. The film of claim 17 wherein said microcapsules have an average particle diameter between about 0.1 and about 0.1 micron.

23. The film of claim 17 wherein said polymeric solid walls comprise polyvinyl alcohol, urea-formaldehyde or melamine-formaldehyde.

24. The film of claim 23 wherein said solid walls comprise polyvinyl alcohol.

25. A non-fibrous substrate having incorporated therein discrete, substantially spherical, air-containing microcapsules having substantially continuous, organic, polymeric, solid walls and an average particle diameter of below about 2 microns, said microcapsules additionally having pigment particles incorporated in the microcapsular structure.

26. The non-fibrous substrate of claim 25 wherein said microcapsules have an average particle diameter between about 0.1 and about 1 micron.

27. The non-fibrous substrate of claim 25 wherein said pigment particles are selected from the group consisting of $TiO_2$, $BaSO_4$, $ZnO$, $CaCO_3 \cdot 3H_2O$.

28. The non-fibrous substrate of claim 27 wherein said pigment particles are $TiO_2$.

29. The non-fibrous substrate of claim 25 wherein said pigment particles protrude through the walls of said microcapsules.

30. The non-fibrous substrate of claim 25 wherein said pigment particles are encapsulated within the walls of said microcapsules.

31. The non-fibrous substrate of claim 25 wherein said polymeric, solid walls comprise polyvinyl alcohol, urea-formaldehyde or melamine-formaldehyde.

32. The non-fibrous substrate of claim 30 wherein said solid walls comprise polyvinyl alcohol.

References Cited

UNITED STATES PATENTS

| | | | |
|---|---|---|---|
| 2,797,201 | 6/1957 | Veatch et al. | 260—2.5 B |
| 3,172,867 | 3/1965 | Showalter | 260—2.5 B |
| 3,255,127 | 6/1966 | Von Bonin | 260—2.5 B |
| 3,293,114 | 12/1966 | Kenaga et al. | 260—2.5 B |
| 3,472,801 | 10/1969 | Lerman et al. | 260—2.5 B |
| 3,371,053 | 2/1968 | Raskin | 260—2.5 B |
| 3,365,358 | 1/1968 | Hutchins | 260—2.5 B |
| 3,353,981 | 11/1967 | Jacob | 260—2.5 B |

MURRAY TILLMAN, Primary Examiner

M. FOELAK, Assistant Examiner

U.S. Cl. X.R.

106—296, 300, 306, 308 Q, 312; 117—100 A, 100 B, 100 S, 167; 162—162; 252—316; 260—2.5 AK, 2.5 F, 41 R, 41 A, 41 B